M. W. Helton,
Reciprocating Saw-Mill.
Nº 10,366.    Patented Jan. 3, 1854.
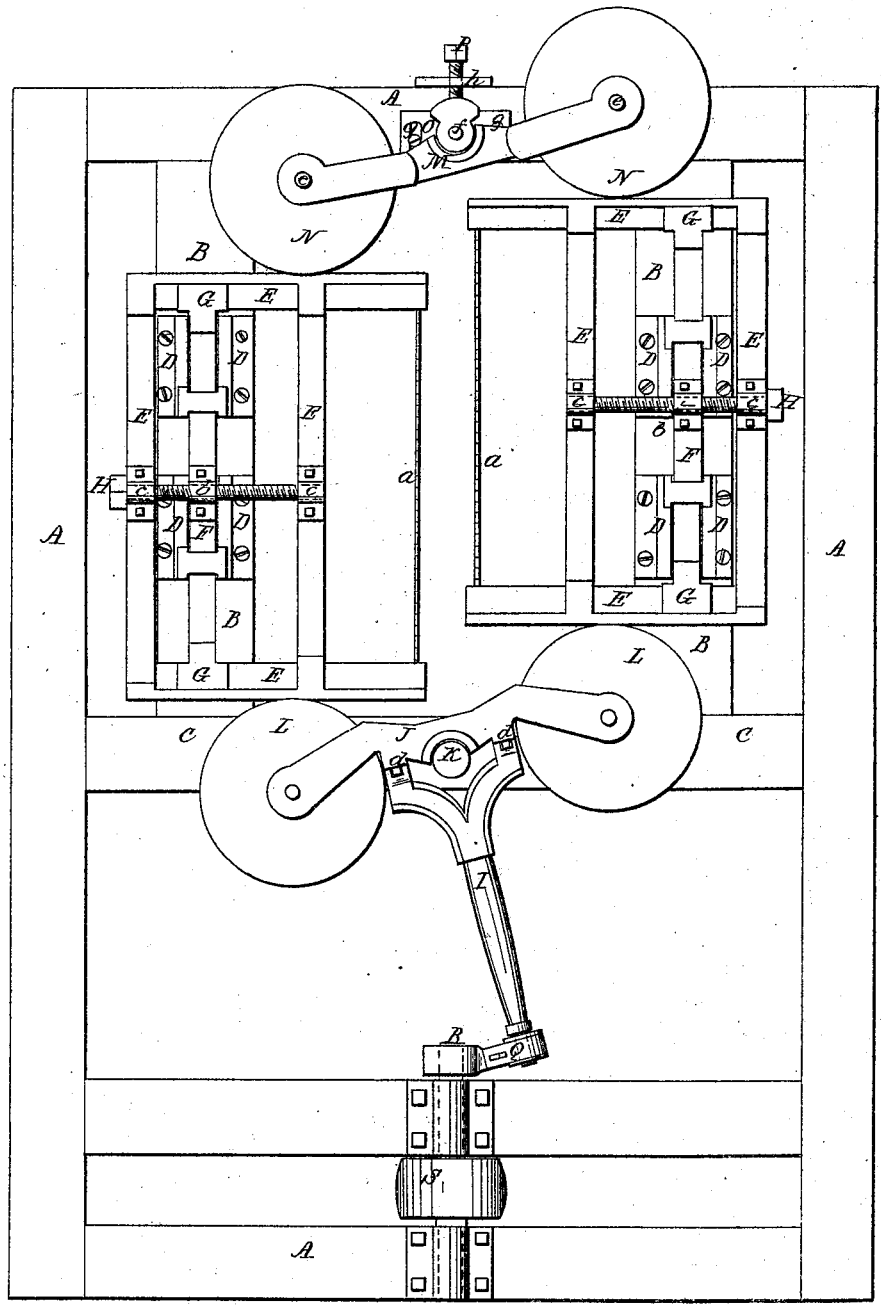

UNITED STATES PATENT OFFICE.

MICHAEL W. HELTON, OF BLOOMINGTON, INDIANA.

METHOD OF HANGING AND OPERATING SAW-GATES.

Specification of Letters Patent No. 10,366, dated January 3, 1854.

*To all whom it may concern:*

Be it known that I, MICHAEL W. HELTON, of Bloomington, in the county of Monroe and State of Indiana, have invented certain new and useful Improvements in the Method of Hanging and Operating Saw-Gates; and I do hereby declare the following to be a full, clear, and exact description of the same, reference being had to the accompanying drawing, making a part thereof, and which represents a front view of a pair of gates or frames designed for operating in the same log, the saws being fed up to the log instead of the log to the saws, as is usually the case.

The nature of my invention consists, in so hanging a pair of gates, the saws of which operate in the same log, as to be self-balancing, the weight of said gates, coming upon a fixed pivot or pin, and not upon the pitman, although the pitman gives them motion, and also the method of operating the gates by a pitman hinged and pivoted at its upper end, and moving in a circular plane at its lower end by a bent crank or otherwise, so as to oscillate the gates without sustaining their weight.

To enable others skilled in the art to make and use my invention, I will proceed to describe the same with reference to the drawing, in which—

A, represents the frame of the mill, and B, B, substantial posts, securely framed into the top cross beam of the frame, and a central cross beam C. On these posts B B, are properly secured the guides D, D, through which the bar of the gates or frames (F, F,) move, and are controlled, as will be described. The gates themselves are formed of four pieces marked E, E, E, E, and may be of wood or iron, firmly put together, and the saws may be hung in the ends thereof, as represented in the drawings at $a$, $a$, in any well known manner. At each end of the bars F, F, are slides G, G, through which the top and bottom pieces of the gates may slide, and by means of the screw rods H, H, working through threaded boxes $b$, $b$, on the bars F, F, and resting with a shoulder in the boxes $c$ $c$, on the saw frame or gate, the gate, and saws in them may be advanced toward, or recede, from each other, to suit the board or other thing to be cut.

The pitman I, is hinged at $d$, $d$, to the cross beam J, and the cross beam in turn is pivoted to the central beam C, by a substantial pin K, which takes the whole weight of the gates or saw frames, and upon which they are balanced. On each end of the cross beam J, are hung friction wheels, L, which support the two gates, and impart to them the oscillating motion which they receive, as will be described hereafter. Over the top of the gates, on the top cross piece of the mill frame A, is pivoted another cross beam M, which carries in each of its ends a friction wheel N, which rest on top of the gates, and may freely turn on their centers $e$, $e$, as should also the lower wheels L, which operate in connection with them. The upper cross beam M, is pivoted at $f$ to a piece O, which is made adjustable by the slots and screws at $g$, and by a set screw P, and plate $h$, through which it passes. This adjustment is for the purpose of bringing the upper friction wheels N, down against the upper part of the gates, with that degree of contact, as will allow them to freely roll along on top of the gates, while they alternately transmit motion to each other, and also prevent any vibration of the gates.

The pitman I, as before described, is hinged at top by its forked arms, to the cross beam J, at $d$, $d$; its lower end is attached to a bent crank Q, attached to a shaft R, through which motion is communicated to the saw frames or gates, either by the shaft of a reacting water wheel when vertical which makes a very simple gear, or by means of a belt passing over the pulley S, from any first mover. The pitman, at the lower end, in its motion, describes a circle, and oscillates the beam J, on its bearing, which throws up one of the gates, and through the upper cross beam and its friction wheels throws down the other, thus using one gate to operate the other, while the pitman merely swings around a fixed center, and does not support any of the weight of the gates, it being suspended itself from the cross beam J, or partly supported by the lower crank Q. Modifications of this general plan may be made, among which may be mentioned the following, viz: the pitman instead of describing a circle at its lower end as described may have a pendulum motion, and effect the same result, and instead of the friction wheels at the top and bottom of the gate there may be curved fingers or brackets, so connecting the gates to the cross beams, as that the said gates may be slid up or back through such connections, and still be driven by them. These are, however, obvious, and would be considered substantially the same thing with those represented.

The carriage for sustaining the log, and feeding it past the saws may be made in any well known manner. It being no part of my invention, I have not represented it.

Having thus fully described the nature of my invention, what I claim therein as new and desire to secure by Letters Patent is—

The driving of the pairs of saw gates, the saws of which operate in the same log, by means of a bifurcated pitman, hinged to the rocking cross beam, by its two arms, and connected by a wrist upon its other end with the crank of the driving shaft, by which means a conical gyratory motion is imparted to the pitman for the purpose, and substantially in the manner described.

MICHAEL W. HELTON.

Witnesses:
A. B. STOUGHTON,
SAML. GRUBB.